July 6, 1937. A. B. DAVIS 2,085,740
PRINTING PLATE MOLD AND METHOD OF MAKING SAME
Filed July 20, 1934 3 Sheets-Sheet 1
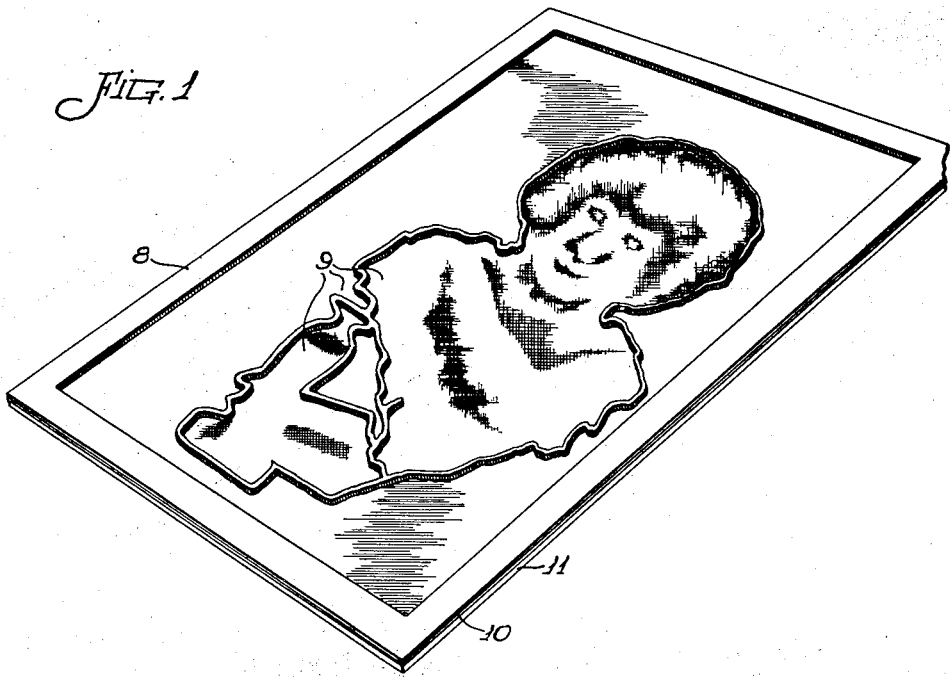
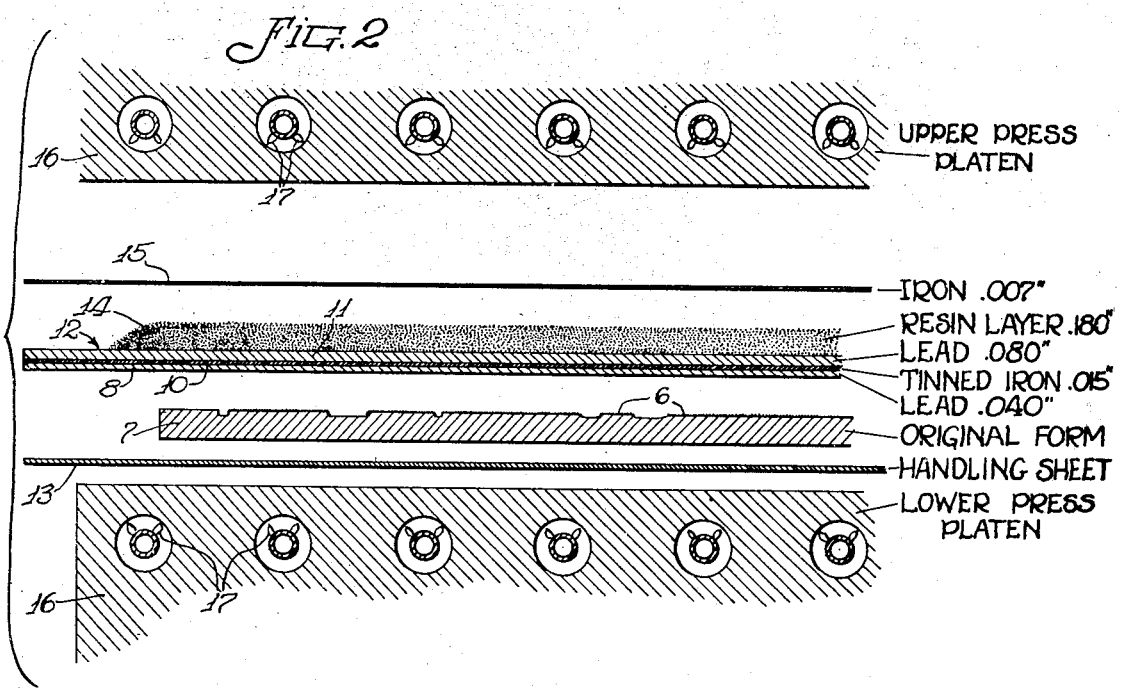
INVENTOR
Arthur B. Davis
By Chindall, Parker & Carlson
ATTORNEYS July 6, 1937.  A. B. DAVIS  2,085,740
PRINTING PLATE MOLD AND METHOD OF MAKING SAME
Filed July 20, 1934   3 Sheets-Sheet 2
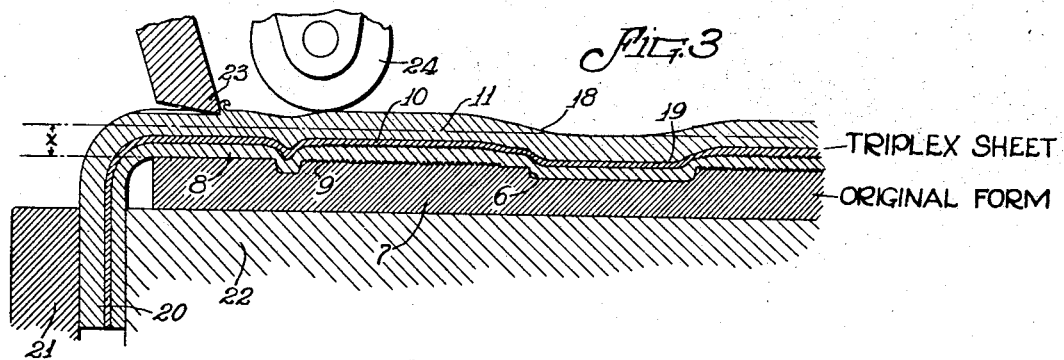
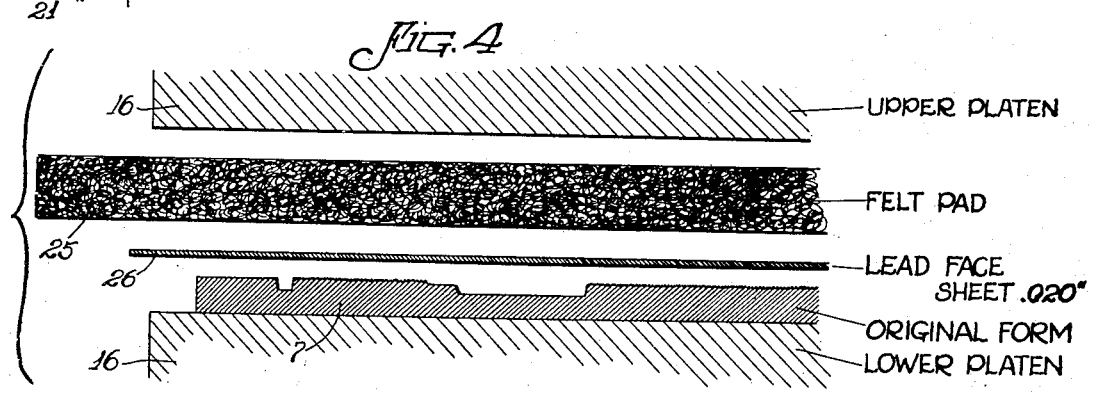
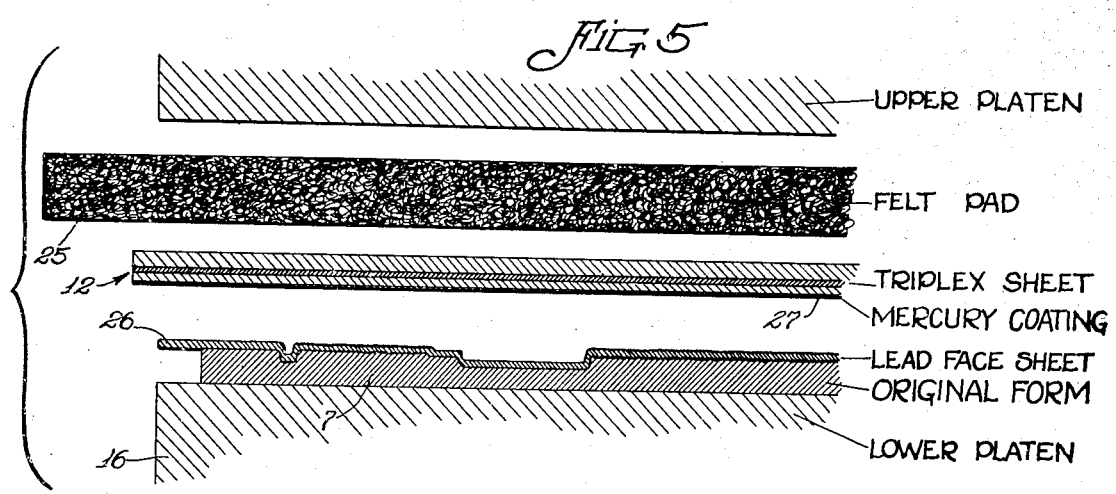
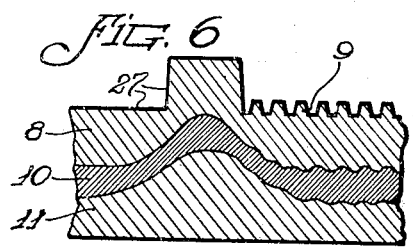
INVENTOR
Arthur B. Davis
By Chindahl, Parker & Carlson
ATTORNEYS July 6, 1937.  A. B. DAVIS  2,085,740
PRINTING PLATE MOLD AND METHOD OF MAKING SAME
Filed July 20, 1934  3 Sheets-Sheet 3
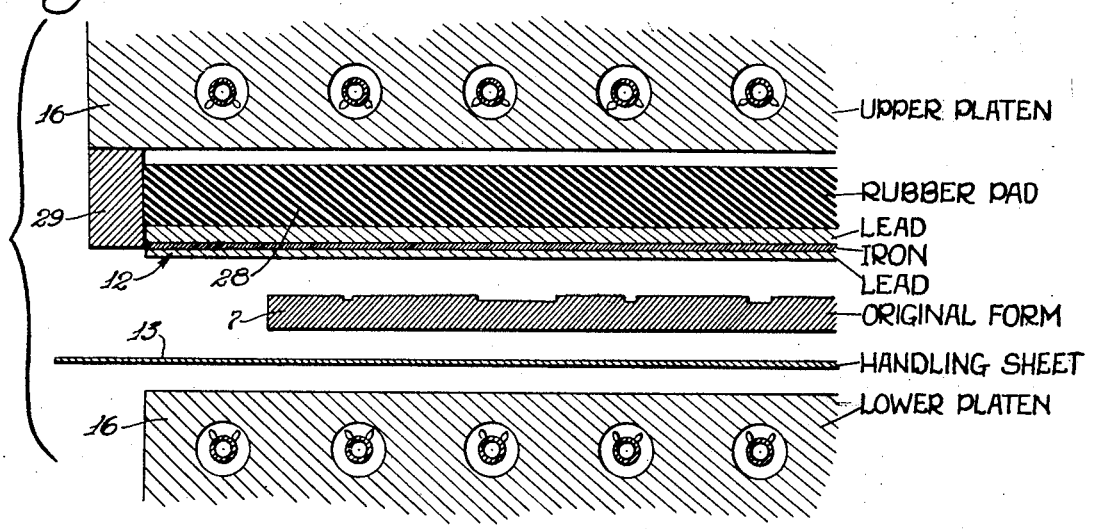
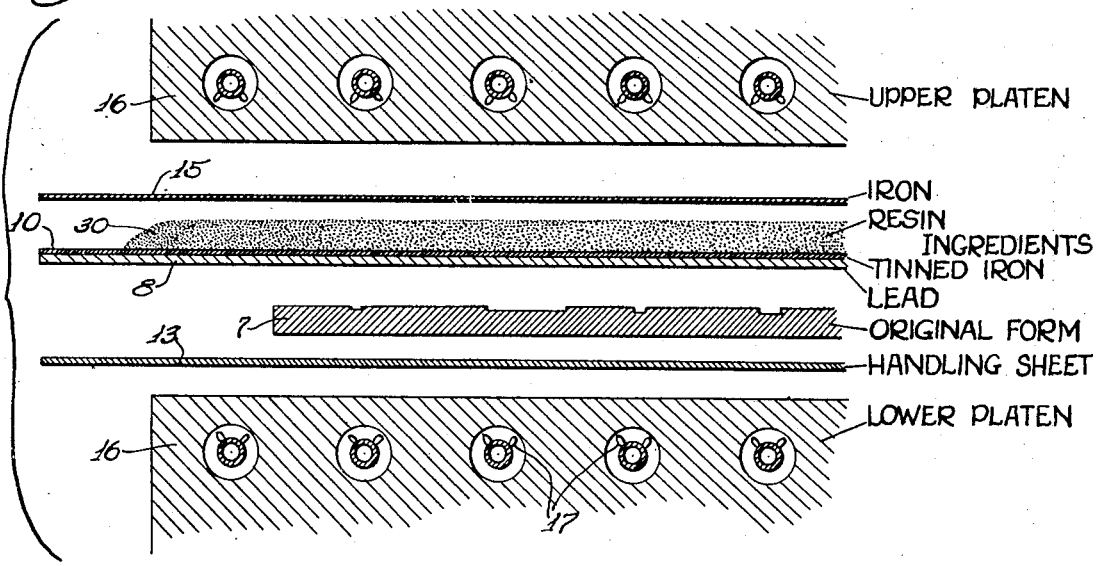
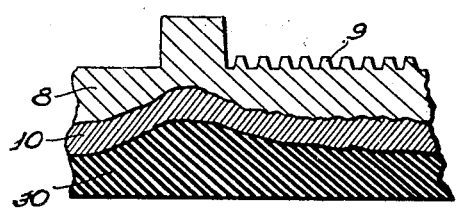
INVENTOR
Arthur B. Davis
By Chindall, Parker + Carlson
ATTORNEYS Patented July 6, 1937

2,085,740

UNITED STATES PATENT OFFICE 2,085,740

PRINTING PLATE MOLD AND METHOD OF MAKING SAME

Arthur B. Davis, Springfield, Ohio

Application July 20, 1934, Serial No. 736,222

8 Claims. (Cl. 41—25)

This invention relates to a mold which has depressions therein complemental to the type and other configurations of an original engraving or printing form and which may be used in the reproduction of these configurations on the surface of a printing plate. More particularly the invention relates to a mold by which a printing plate may be formed by a molding process.

The primary object of the present invention is to provide a new and improved mold of the above character by which a high degree of detail may be obtained in the reproduction of an original printing form surface on a printing plate.

Another object is to provide a novel method of forming a mold which is capable of withstanding the pressure necessary to form a printing plate therefrom composed of synthetic resin while at the same time reproducing all of the details of the original printing form.

The invention also resides in the novel manner of applying the molding pressure in the formation of the mold surface and in the construction of the mold which enables the back thereof to be formed with a flat surface.

Other objects and advantages of the invention will become apparent from the following detailed description taken in connection with the accompanying drawings, in which Figure 1 is a perspective view of a finished mold embodying the features of the present invention.

Fig. 2 is a cross-sectional view of a press illustrating the manner of assembling the parts preparatory to forming the mold.

Fig. 3 is a cross-section of the partially finished mold illustrating the manner of leveling off the back thereof.

Figs. 4, 5, 7 and 8 are views similar to Fig. 2 illustrating an alternative method of forming the mold.

Fig. 6 is an enlarged fragmentary sectional view of the mold shown in Fig. 1.

Fig. 9 is a cross-sectional view of an alternative form of mold.

While the invention is susceptible of various modifications, I do not intend by the present exemplary disclosure to limit the invention but aim to cover all modifications and alternatives falling within the spirit and scope of the invention as expressed in the appended claims.

The mold shown in the drawings by way of illustration is intended primarily for use in reproducing the type and other configurations 6 of an original engraving or printing form 7 upon the surface of a printing plate (not shown) having type projections composed mainly of a synthetic resin preferably of the thermo-plastic type such as a polymerization product of a vinyl compound. In the form shown in Fig. 1, the mold comprises generally a layer 8 of ductile material having indentations 9 in one surface complemental to the type of the printing form and secured to a sheet 10 of stronger reinforcing metal which is backed by a layer 11 of material of such character that the back of the mold may be formed with substantially continuous flat surface whereby the projections thereon will be supported properly in the use of the mold for forming a printing plate.

In the present instance, the mold face is composed of lead which possesses sufficient ductility to take a sharp impression of the surface of the original printing form 7 under the pressure to which the latter may be subjected safely without danger of distortion. It is contemplated that other metals, such for example as alloys of lead, tin, etc., may be used, the proper degree of ductility and ability to withstand the heat to which the mold is subjected being the requisite properties. While the thickness of the layer 8 may be varied considerably, a layer approximately .040 of an inch thick is used in the present instance.

The functions of the reinforcing sheet 10 are to prevent excessive lateral flow of the metal of the layer 8 during formation of the mold and to give the mold sufficient tensile strength to enable its back surface to be machined readily as will appear later. Herein, this sheet is composed of steel and is .007 inch in thickness. The layer 8 and the sheet 10 may be secured together in any suitable way, such as by soldering. This may be accomplished simply and conveniently by employing a steel sheet having a tinned surface which will adhere to the layer 8 when the latter and the sheet 10 are sweated together after coating one of the surfaces with a suitable flux.

When, as is preferably the case, the back of the mold is to be formed with a flattened surface by a cutting or machining operation, the backing layer 11 is preferably composed of a readily workable metal such as lead of a thickness sufficient to allow a safe margin for removal of all of the irregularities formed in the back of the mold during the pressing operation. A layer .080 of an inch thick has been found to be satisfactory for this purpose.

The method of forming the mold shown in Fig. 1 contemplates first the formation of a composite plate 12 comprising the layers 8 and 11 of lead sweated to opposite sides of a tinned steel sheet 10 by pressing the assembled parts together while they are heated to a temperature of about 500 degrees F. which is sufficient to unite the tin and lead. For a purpose to appear presently, at least one dimension of the plate is substantially greater than the corresponding dimension of the form 7.

To form the mold, the original form is placed type face up on a metal sheet 13 to facilitate handling and then the composite plate 12 is laid on the form with the lead layer 8 against the type surface of the form and with one marginal edge of the plate projecting a substantial distance beyond the form. Next, the composite plate is forced against the form surface under a pressure sufficient to cause the ductile metal to flow into the form cavities and uniformly distributed so that a sharp impression is taken of the entire form surface. To simulate a hydraulic action without the necessity of confining the fluid, the pressure is preferably applied through the medium of a plastic material. One material suitable for this purpose is the thermoplastic resin known as vinylite which, as above set forth, is a polymerization product of a vinyl compound and which becomes plastic upon heating to a moderate temperature.

In the use of the plastic material, the composite plate 12 is covered with a layer 14 of the powdered ingredients for forming the resin and the assembly supported on the handling sheet 13 is transferred onto the lower platen of a hydraulic press, the platens 16 of which are heated in any suitable way, as by gas flames 17, to a temperature of about 300 degrees F. which is sufficient to cause the ingredients of the resin to react to form a homogeneous plastic mass. The upper platen is lowered against the metal sheet 15 where it is allowed to remain for about five minutes to cause reaction and proper softening of the resin. The press is then operated to force the parts together under a pressure of approximately 2500 pounds per square inch. The resin layer is thus compressed and being in a plastic or semi-fluid condition transmits the pressure to the plate with a hydraulic action so that the pressure is distributed uniformly to the different areas of the plate 12 and the metal of the layer 8 is caused to flow into all of the cavities of the type surface completely filling the latter. Nevertheless the softened resin possesses sufficient body to withstand the necessary pressure without becoming squeezed out at the edges of the form. The steel sheet 10, being relatively stronger than the ductile layer 8, serves to prevent excessive lateral flow of the lead and a resultant distortion of the dot cavities in the mold face. By applying the pressure in this manner, it has been found that an exceedingly sharp impression of the form surface will be obtained and that all of the dots for producing the different color shades are reproduced even more perfectly than is possible with present electrotyping methods.

Upon removal of the assembly from the hydraulic press, the resin layer, which does not adhere readily to the lead surface, is stripped off from the layer 11, and being a thermoplastic resin, may, if desired, be used again as a pressure transmitting medium in the formation of another mold.

As shown in Fig. 3, the upper surface of the layer 11 will be indented by depressions 18 corresponding to the larger cavities of the form surface. To remove these so that the raised portions 19 of the mold face will be supported properly in the molding of a printing plate therefrom, the exposed surface of the layer 11 is machined down to substantial flatness while the mold is still attached to the form and thereby properly supported against distortion by pressure applied to the back of the mold. Such machining may be effected by means of a so-called shaving machine, one form of which is shown in Fig. 3. During shaving, the projecting marginal edge of the composite plate 12 is bent to form a flange 20 which may be anchored by a suitable clamp 21 when the form and mold assembly is supported upon a traveling carriage 22 of the machine. As the latter is shifted to the left as viewed in Fig. 3 relative to a blade 23, which is stationary in the present instance, the metal of the layer 8 is shaved off to a depth determined by the setting of the blade. During this operation, rollers 24 press the mold against the form and the reinforcing sheet 10 provides the tensile strength necessary to prevent distortion of the mold. Preferably, the metal removed is a series of cuts across the layer 11.

The mold is machined down to a depth at least sufficient to insure removal of all of the indentations therein opposite the type cavities in the mold. If desired, additional metal may be removed in order to obtain a thickness which may be standard for all of the molds in the printing establishment. In the present instance, the mold is shaved to a depth such that the distance $x$ (Fig. 3) between the machined surface and the roots of the mold cavities, that is, from the type face of the form 7, is .105 of an inch. After the shaving operation, the mold is lifted carefully off from the form 7 and completed by straightening out or cutting off the flange 20.

The pressure for taking the impression of the form surface may be applied through an elastic medium, such for example as a pad 28 of rubber of the required resiliency. During the formation of the mold in this way, the parts would be assembled in the press as shown in Fig. 7. To insure application of the proper pressure, the pad preferably should be confined at its edges by abutments 29 which may be carried by one of the platens 16.

Instead of using rubber, a pad 25 of felt may be employed as the pressure transmitting medium in which case the mold is preferably formed in two operations during the first of which a lead face sheet, preferably about .020 of an inch thick, is pressed against the surface of the original form with the parts arranged as shown in Fig. 4. The press need not be heated for this operation during which relatively lower pressures may be used. Then the upper surface of the face sheet 26 and the surface of the layer 8 of the composite plate 12 are covered with a coating of mercury so that they will become amalgamated and firmly united when the parts, assembled as shown in Fig. 5, are forced together under a pressure approximately 2500 pounds per square inch. The desired detail is obtained in this operation after which the back surface of the mold is shaved in the manner above described to remove irregularities.

While the desired accuracy in the formation of the mold may be obtained most conveniently by machining the back surface, a flat surface may also be formed by molding and at the same time that the impression of the form surface is taken. To this end, the mold, as shown in Fig. 9, may comprise the lead layer 8, the reinforcing sheet 10, and a molded layer 30 of synthetic resin.

Preferably, the layer 30 is composed of a plastic condensation product such as bakelite which is infusible or non-thermoplastic, that is to say, one which will not soften and become plastic upon heating after the original reaction. Such a backing will withstand the heat and pressure required to which the mold is subjected in the use of the same for molding a printing plate from the vinyl resin above referred to.

In order to form a unitary mold structure, the layer 30 may be united with the sheet 10 through the medium of a sheet (not shown) of fabric to which the resin will adhere readily. The fabric may be suitably secured to the metal sheet by means of an adhesive such as sodium silicate. After attachment of the fabric to the sheet 10, the mold shown in Fig. 9 may be formed in one pressing operation, the parts being arranged between the press platens as shown in Fig. 8 with the fabric covered with the powdered ingredients which react to form the resin. When heated to the proper temperature and under the pressure employed for taking the impression, these ingredients first soften into a plastic mass which distributes the pressure properly and finally sets into a homogeneous infusible mass. The mold is thus completed in a single operation.

Under some conditions, such for example as where a relatively large number of duplicate plates are to be formed from one mold, it is desirable to provide a metal face on the mold substantially harder than can be obtained with lead which is employed because of its high ductility so as to form a sharp impression of the form surface. I have discovered that the mold surface may be hardened to the desired degree without destroying the detail of the dots by electro-depositing a very thin film 27 (Fig. 6) of a harder metal such as nickel or chromium on the face of the mold. The deposit may be formed by standard electroplating methods and becomes an integral part of the mold.

I claim as my invention:

1. A printing plate mold comprising, in combination, two layers of ductile metal such as lead soldered to opposite sides of a reinforcing sheet of substantially stronger metal, the outer surface of one of said layers being indented by type cavities corresponding to the printing surface to be formed, said other layer having a continuous flat outer surface parallel to the roots of said type cavities.

2. The method of making a printing plate mold which comprises soldering a thin layer of ductile metal such as lead to a layer of stronger metal, thereafter applying a uniformly distributed pressure to the composite sheet to force the outer surface of said layer into the cavities of an original form surface, and forming a backing for said sheet having a continuous flat outer surface.

3. The method of making a printing plate mold which comprises securing layers of ductile metal such as lead to opposite side surfaces of a thinner sheet of reinforcing metal such as steel, thereafter forcing the composite sheet against an original form surface under a uniformly distributed pressure whereby to form indentations in one of said layers corresponding to the type to be formed, and machining off the other layer while the composite sheet remains on said form to form continuous flat surfaces parallel to the roots of said indentations.

4. The method of making a printing plate mold which comprises securing layers of ductile metal to opposite side surfaces of a thinner sheet of reinforcing metal, said sheet having at least one dimension which is substantially greater than the corresponding dimension of an original form the type surface of which is to be reproduced, placing the composite plate on said form with the surface of one of said layers lying against said type surface and one marginal edge projecting beyond the form, applying a uniformly distributed pressure to the opposite side of the composite plate whereby to force the surface metal of said first mentioned layer into the cavities of said form, anchoring said projecting edge to hold the composite sheet against edgewise displacement while attached to said form, and performing a metal-removing operation on the exposed surface of said plate whereby to form a flat surface parallel to the type indentations.

5. The method of making a mold of the type surface of an original form which comprises securing sheets of ductile metal to opposite surfaces of a thinner sheet of flexible reinforcing material, placing the composite plate thus formed on said form with one of said ductile sheets in contact with said type surface, applying to the other side of the plate through the medium of a layer of yieldable material pressure sufficient to force the ductile metal into the cavities of said type surface, and machining off the irregularities in the upper surface of the plate before removal of the latter from said form.

6. The method of making a mold for use in molding a printing plate comprising pressing a sheet of ductile metal against the type face of an original printing form, applying an amalgamating material such as mercury to the abutting surfaces of said sheet and a composite sheet having a reinforcing metallic sheet therein and applying pressure to said composite sheet while the first mentioned sheet remains on said form.

7. The method of making a mold for use in molding a printing plate comprising pressing a sheet of ductile metal against the type face of an original printing form, securing said sheet to a composite sheet having therein a reinforcing sheet composed of substantially stronger metal, and applying a substantially greater pressure to said composite sheet while said first mentioned sheet remains on said form.

8. A printing plate mold comprising, in combination, a layer of ductile metal having impressed in one face thereof cavities corresponding to the type surface of the printing plate to be formed, a reinforcing sheet embedded in said layer and composed of material substantially stronger to resist tensile forces than the metal of said layer, and a continuous flat back face on said layer machined to true parallelism relative to the surfaces defining the bottoms of said cavities, said reinforcing sheet acting to resist the edgewise tension applied to said layer during the machining of said back face.

ARTHUR B. DAVIS.